United States Patent
Kristen et al.

(10) Patent No.: US 12,539,720 B2
(45) Date of Patent: Feb. 3, 2026

(54) UTILITY-VEHICLE TYRE

(71) Applicant: Continental Reifen Deutschland GmbH, Hannover (DE)

(72) Inventors: Florian Kristen, Burgwedel (DE); André Lutz, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 202 days.

(21) Appl. No.: 18/254,454

(22) PCT Filed: Nov. 2, 2021

(86) PCT No.: PCT/DE2021/200169
§ 371 (c)(1),
(2) Date: May 25, 2023

(87) PCT Pub. No.: WO2022/111770
PCT Pub. Date: Jun. 2, 2022

(65) Prior Publication Data
US 2024/0001635 A1    Jan. 4, 2024

(30) Foreign Application Priority Data

Nov. 25, 2020  (DE) .................... 10 2020 214 761.2

(51) Int. Cl.
*B29D 30/54*    (2006.01)
*B60C 13/00*    (2006.01)

(52) U.S. Cl.
CPC ............ *B60C 13/001* (2013.01); *B29D 30/54* (2013.01); *B29D 2030/541* (2013.01); *B29D 2030/546* (2013.01)

(58) Field of Classification Search
CPC ....... B60C 11/01; B60C 11/24; B60C 13/001; B60C 13/02; B29D 30/54; B29D 2030/541; B29D 2030/548
See application file for complete search history.

(56) References Cited

U.S. PATENT DOCUMENTS

| 2004/0084120 A1 | 5/2004 | Arnold et al. | |
| 2013/0075007 A1* | 3/2013 | Fujii | B60C 13/02 |
| | | | 152/523 |

(Continued)

FOREIGN PATENT DOCUMENTS

| DE | 102014209422 A1 | 11/2015 | |
| JP | 02310107 A | * 12/1990 | |
| JP | 11321243 A | * 11/1999 | B60C 13/02 |

OTHER PUBLICATIONS

English machine translation of JP02310107. (Year: 1990).*

(Continued)

*Primary Examiner* — Robert C Dye
(74) *Attorney, Agent, or Firm* — Richard A. Wolf; Gregory Adams

(57) ABSTRACT

The invention relates to a commercial vehicle tire which is cold-retreadable and comprises sidewalls (5), belt plies (2a) and a profiled tread (1) with shoulder flanks (8a) located outside the ground contact area and running to the sidewalls (5), wherein a buffing indicator (9, 9', 9") for indicating the buffing depth is provided on at least one shoulder flank (8a), running around in the circumferential direction, possibly interrupted in some portions and formed by a multiplicity of elevations (10), wherein the elevations (10) have with respect to the level of the shoulder flank (8a) a maximum thickness, determined perpendicularly to this level, of 0.5 mm to 2.0 mm.

Figure 1:
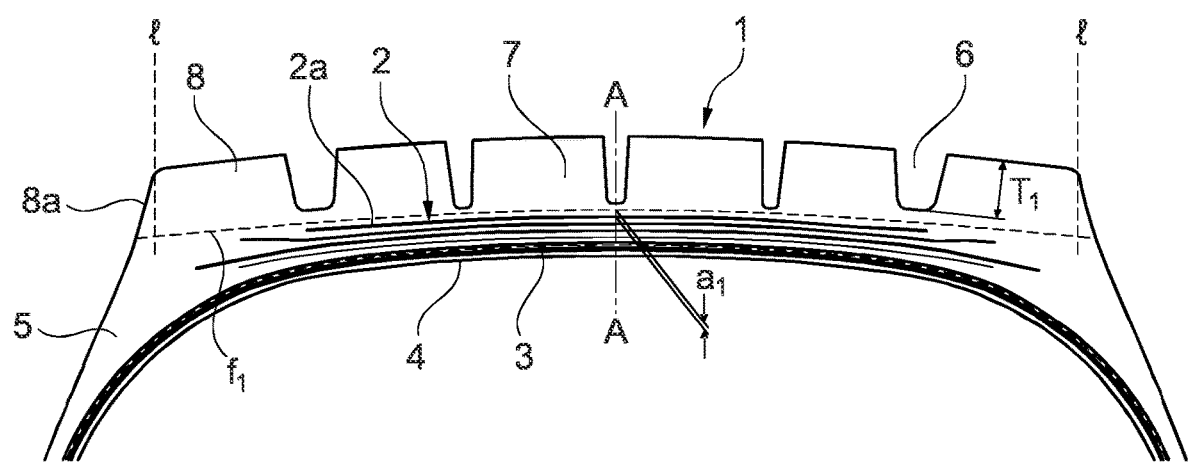

The elevations (10) of the buffing indicator (9, 9', 9") are dome-shaped and have a circular base area with a diameter of 0.5 mm to 2.0 mm.

15 Claims, 2 Drawing Sheets

(56) References Cited

U.S. PATENT DOCUMENTS

| | | | |
|---|---|---|---|
| 2014/0326375 A1* | 11/2014 | Okabe | B60C 9/0007 152/154.2 |
| 2015/0328937 A1* | 11/2015 | Girard | B60C 11/03 152/154.2 |
| 2017/0225519 A1* | 8/2017 | Lutz | B60C 11/24 |
| 2020/0031174 A1 | 1/2020 | Lejeune et al. | |

OTHER PUBLICATIONS

English machine translation of JP11321243 (Year: 1999).*
International Search Report dated Feb. 1, 2021 of International application PCT/DE2021/200169 claiming priority to this application.

* cited by examiner

UTILITY-VEHICLE TYRE

The invention relates to a commercial vehicle tire which is cold-retreadable and comprises sidewalls, belt plies and a profiled tread with shoulder flanks located outside the ground contact area and running to the sidewalls, wherein a buffing indicator for indicating the buffing depth is provided on at least one shoulder flank, running around in the circumferential direction, possibly interrupted in some portions and formed by a multiplicity of elevations, wherein the elevations have with respect to the level of the shoulder flank a maximum thickness, determined perpendicularly to this level, of 0.5 mm to 2.0 mm.

When cold retreading a commercial vehicle tire, the worn tread is removed and, after roughening, a new, profiled and already vulcanized or pre-vulcanized tread is applied, by using an unvulcanized binding rubber layer, at a temperature between in particular 95° C. and 115° C., with vulcanization of the binding rubber. A commercial vehicle tire can be retreaded several times. To indicate the recommended buffing depth for buffing, it is known to form buffing indicators on the shoulder flanks of the tread.

A pneumatic vehicle tire of the type mentioned at the beginning is known for example from DE 10 2014 209 422 A1. The tire has a tread with shoulder flanks running toward the sidewalls, with linear elevations or linear depressions designed in the manner of hatching and forming a buffing indicator being provided on at least one shoulder flank. Starting from a radius that corresponds to the buffing depth, the elevations or depressions each extend radially outward over a height determined in the radial direction, i.e. in the direction of the tread periphery. The linear elevations or depressions, determined on the basis of the radius, enclose an angle of 5° to 60° with the radial direction of the tire. According to a preferred embodiment, the elevations have a thickness of 0.5 mm to 2.0 mm with respect to the level of the shoulder flank. When buffing the tread, the disappearance of the hatching indicates that the buffing depth has been reached.

Due to the shape and arrangement of the elevations, with the known buffing indicator there is the risk that the elevations will tear when they come into contact with curbs and as a result of the continuous loads that occur when driving. Furthermore, the elongated elevations of the buffing indicator cause air turbulence when driving, and thus increase the air resistance acting on the rolling tire.

The invention is therefore based on the object of improving the buffing indicator in terms of its air resistance and its tear resistance in the case of a pneumatic vehicle tire of the type mentioned at the beginning.

The stated object is achieved according to the invention by the elevations of the buffing indicator being dome-shaped and having a circular base area with a diameter of 0.5 mm to 2.0 mm.

The elevations provided according to the invention thus have an aerodynamically optimized shape. In contrast to the known, linear elevations, the elevations designed according to the invention in a dome-shaped manner and with a circular base area have a significantly lesser tendency to entrain air molecules during the rotation of the tire, as a result of which the air resistance is reduced. Furthermore, any deformation forces occurring on the sidewalls are evenly distributed around the elevations, so that stress peaks are effectively avoided and tear resistance is increased.

According to a preferred embodiment, elevations which border on the side of a reference circle running around the shoulder flank that faces the tread periphery are provided, the reference circle originating from a reference surface projected onto the respective shoulder flank which, when viewed in cross section of the tire, runs parallel to the tread periphery in the region inside the ground contact area and continues to follow its course to the shoulder flanks in the region axially outside the ground contact area and which has in the tire equatorial plane a distance, determined in the radial direction, from the radially outermost belt ply in the direction of the tread periphery of up to 2.0 mm. Elevations formed at this point are in a particularly advantageous position for indicating the buffing depth.

In this embodiment, it is also advantageous if the distance between the reference surface and the radially outermost belt ply is at least 1.0 mm. The buffing indicator thus indicates a buffing depth lying radially outside the belt rubber coating, so that the likelihood of the belt rubber coating being roughened inadvertently or too much during buffing is reduced.

With regard to the visibility and the tear resistance of the elevations, it is favorable if the diameter of the circular base areas of the elevations and the maximum thickness of the elevations is in each case at least 1.0 mm.

According to a further preferred embodiment, the magnitude of the maximum thickness of the elevations is at most 50% of the magnitude of the diameter of the circular base area of the elevations. This measure also contributes to good tear resistance of the elevations.

According to a further preferred embodiment, the magnitude of the maximum thickness of the elevations is at least 25% of the magnitude of the diameter of the circular base area of the elevations.

The deformation forces occurring on the sidewalls around the elevations when the tire is rolling are particularly uniform if the elevations each have the shape of a spherical segment, in particular at most a hemisphere. Stress peaks are thus avoided particularly effectively.

According to a further preferred embodiment, elevations which have distances of 0.5 mm to 1.5 mm from one another, determined as minimum distances, are provided, with elevations which have mutually matching distances, determined as minimum distances, preferably being provided, so that very good visibility of the buffing indicator is ensured.

Furthermore, it is advantageous if the elevations are formed within a circular ring with a width, determined perpendicularly to the circumferential direction, of at most 20.0 mm. This is favorable in terms of air resistance.

According to a further preferred embodiment, the elevations are formed in such a way that the buffing indicator as a whole has the shape of a circular ring, with the elevations preferably being provided exclusively within a number of rows running around in the circumferential direction. Due to the shape of the circular ring, the buffing process can be ideally monitored over the entire circumference of the tire. In this context, elevations which are provided in a number of rows running in the circumferential direction are particularly advantageous.

According to an alternative preferred embodiment, the elevations are formed in such a way that the buffing indicator has the shape of a circular ring interrupted in some portions, the elevations preferably being arranged exclusively in circumferential rows that are uninterrupted in some portions in the circumferential direction. This embodiment is also advantageous with regard to the visibility and air resistance of the buffing indicator.

According to a further preferred embodiment, the buffing indicator comprises a number of rows of elevations arranged one behind the other, aligned in the circumferential direction and running next to and parallel to one another, or is formed by such rows, the rows each having a length, determined in the circumferential direction, of preferably 20.0 mm to 200.0 mm. The progress of the buffing process can be easily followed by means of such rows.

In this embodiment, it is also favorable if adjacent rows of different lengths are provided, the length decreasing from row to row in the direction of the tread periphery, in particular to the same extent, with the row of the greatest length—with respect to two adjacent rows in each case—reaching beyond the row of smaller length at each end with matching overhangs.

A buffing indicator is preferably formed on each shoulder flank.

Figure 2:
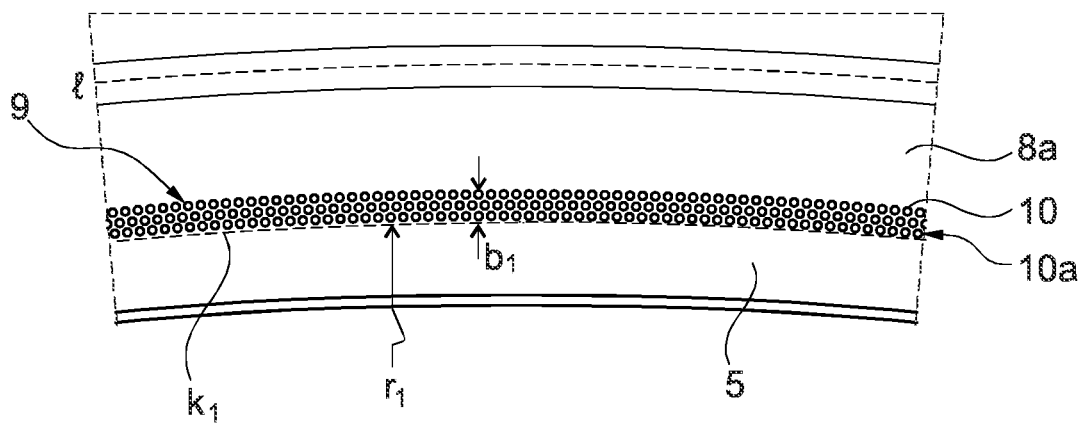
Figure 3:
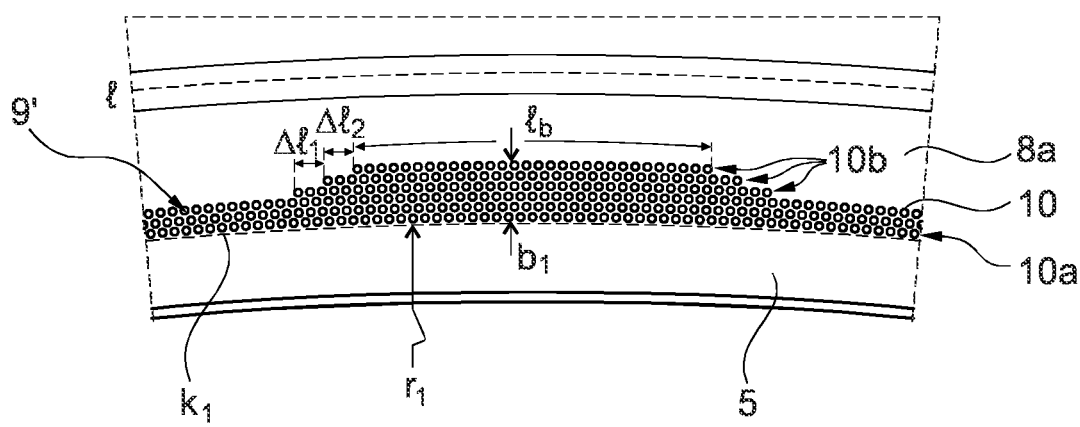
Figure 4:
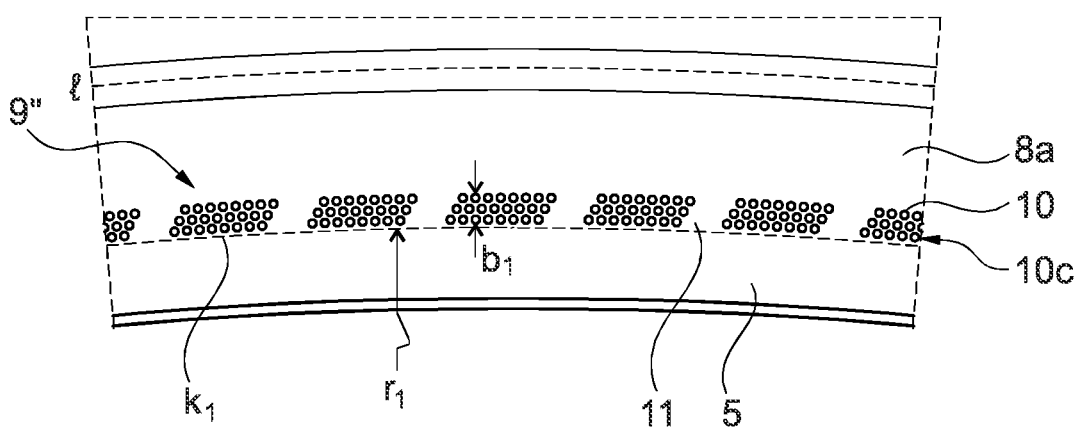

Further features, advantages and details of the invention will now be described in more detail on the basis of the drawing, which schematically shows exemplary embodiments of the invention. In the drawing:

FIG. 1 shows a schematic partial cross section through a commercial vehicle tire in the region of the tread and the belt assembly, FIG. 2 shows a view of a circumferential portion of a shoulder flank of the commercial vehicle tire with a first variant of an embodiment of the invention, FIG. 3 shows a view of a circumferential portion of a shoulder flank of the commercial vehicle tire with a second variant of an embodiment of the invention and FIG. 4 shows a view of a circumferential portion of a shoulder flank of the commercial vehicle tire with a third variant of an embodiment of the invention.

The invention relates to a buffing indicator for indicating the buffing depth of a commercial vehicle tire intended for cold retreading.

Of the components of the commercial vehicle tire, FIG. 1 shows a tread 1, a belt assembly 2 with four belt plies 2a, a carcass inlay 3 and an inner layer 4 as well as the radially outer end portions of sidewalls 5. The tire equatorial plane is indicated by aline A-A, the lateral edges of the tread 1 or the ground contact area of the tread 1 (according to the E.T.R.T.O standard) are indicated by two lines l running parallel to the tire equatorial plane.

The tread 1 is provided with a profiling, which in the example shown has five circumferential grooves 6 made to the profile depth $T_1$, so that the tread 1 has four central profile ribs 7 and two shoulder-side profile ribs 8. The shoulder-side profile ribs 8 each have outside the ground contact area a shoulder flank 8a extending to the lateral edge of the ground contact area (line l) and running to the corresponding sidewall 5.

The buffing depth already mentioned at the beginning is marked in FIG. 1 by a reference surface $f_1$. When viewed in cross section of the tire, the reference surface $f_1$ runs parallel to the tread periphery radially inside the circumferential grooves 6 made to the profile depth $T_1$ in the region between the lines l and continues to follow its course to the shoulder flanks 8a in the region axially outside the lines l, the reference surface $f_1$ having in the tire equatorial plane (line A-A) a distance $a_1$, determined in the radial direction, from the radially outermost belt ply 2a in the direction of the tread periphery of up to 2.0 mm. The distance $a_1$ is preferably at least 1.0 mm. The continuation of the reference surface $f_1$ into the regions axially outside the lines l, when viewed in cross section of the tire, takes place with that radius of curvature which approximates best to the local curvature of the reference surface $f_1$ at the intersection with the line l.

FIG. 2 to FIG. 4 each show a side view (viewing direction in the direction of the axis of rotation of the tire) of a portion of the tire and therefore views of circumferential portions of a shoulder flank 8a with the adjacent circumferential portion of the radially outer end portion of the adjoining sidewall 5. The reference surface $f_1$ projected onto the respective shoulder flank 8a corresponds to a reference circle $k_1$ running around the shoulder flank 8a with a radius $r_1$, where the center of the reference circle $k_1$ lies on the axis of rotation (not shown) of the tire. A buffing indicator 9 (FIG. 2), 9' (FIG. 3), 9" (FIG. 4) for indicating the buffing depth is formed on each shoulder flank 8a, adjacent to the reference circle $k_1$ in the region between the reference circle $k_1$ and the lateral edge of the ground contact area (line l), running around in the circumferential direction and possibly interrupted in some portions. The buffing indicator 9, 9', 9" is formed by a multiplicity of identically designed dome-shaped elevations 10, each of which has a maximum thickness, determined perpendicularly to the level of the shoulder flank 8a, of 0.5 mm to 2.0 mm, in particular of at least 1.0 mm, and a circular base area with a diameter, determined at the level of the shoulder flank 8a, of 0.5 mm to 2.0 mm, in particular of at least 1.0 mm. Preferably, the magnitude of the maximum thickness is at most 50% of the magnitude of the diameter. Furthermore, the dome-shaped elevations preferably each have the shape of a spherical segment, which is particularly preferably at most a hemisphere. Furthermore, the elevations 10, determined at the level of the shoulder flank 8a, are formed at preferably matching distances of 0.5 mm to 1.5 mm, determined as minimum distances.

The buffing indicator 9 shown in FIG. 2 is formed by three rows 10a of elevations 10 running in the circumferential direction and therefore has the shape of a circular ring.

The buffing indicator 9' shown in FIG. 3 differs from the buffing indicator 9 in that a group of three rows 10b of elevations 10 aligned in the circumferential direction and running next to and parallel to one another is additionally provided locally. The rows 10b each have a length $l_b$, determined in the circumferential direction, where, starting from the row 10b closest to the rows 10a, the length $l_b$ decreases from row 10b to row 10b, in particular to the same extent, so that one of the rows 10b has the greatest length $l_b$, one of the rows 10b has the smallest length $l_b$ and one of the rows 10b has a medium length $l_b$. The row 10b of the greatest length $l_b$ reaches beyond the row 10b of the medium length $l_b$ at each end with an overhang $\Delta l_1$, determined in the circumferential direction. Furthermore, the row 10b of the medium length $l_b$ reaches beyond the row 10b of the smallest length $l_b$ at each end with an overhang $\Delta l_2$, determined in the circumferential direction, of a magnitude which in the exemplary embodiment shown matches the magnitude of the overhang $\Delta l_1$. The length $l_b$ is preferably 20.0 mm to 200.0 mm. Several groups of rows 10b can be provided at different circumferential positions of the buffing indicator 9. For example, four groups of rows 10b arranged offset from one another by 90° are provided.

The buffing indicator 9" shown in FIG. 4 differs from the buffing indicator 9 in that it is interrupted in some portions, with the resulting interruptions 11, where there are no elevations 10, being essentially parallelogram-shaped. In particular, the elevations 10 are preferably arranged exclusively in rows 10c that run around in the circumferential direction and are interrupted in some portions in the circumferential direction.

In all of the variants described, the elevations 10 of directly adjacent rows 10b, 10c are arranged with an offset, determined in the circumferential direction, which corresponds to 50% of the diameter of an elevation 10. The elevations 10 are preferably within a circular ring with a width $b_1$ (FIG. 2 to FIG. 4), determined perpendicularly to the circumferential direction, of at most 20.0 mm.

The invention is not limited to the exemplary embodiments described.

A buffing indicator is formed on at least one shoulder flank.

LIST OF REFERENCE SIGNS

1 . . . Tread
2 . . . Belt assembly
2a . . . Belt ply
3 . . . Carcass inlay
4 . . . Inner layer
5 . . . Sidewall
6 . . . Circumferential groove
7 . . . Central profile rib
8 . . . Shoulder-side profile rib
8a . . . Shoulder flank
9, 9', 9" . . . Buffing indicator
10 . . . Elevation
10b, 10c . . . Row
11 . . . Interruption
A-A . . . Line (tire equatorial plane)
$a_1$ . . . Distance
$b_1$ . . . Width
$f_1$ . . . Reference surface (buffing depth)
$k_1$ . . . Reference circle (buffing depth)
l Line . . . (lateral edge of the ground contact area)
$l_b$ . . . Length
$\Delta l_1, \Delta l_2$ . . . Overhang
$r_1$ . . . Radius
$T_1$ . . . Profile depth

The invention claimed is:

1. A retreadable vehicle tire comprising:
one or more sidewalls;
belt plies;
a tread with one or more shoulder flanks outside a ground contact area and running to the sidewalls;
a buffing indicator to indicate a buffing depth and located on the one or more shoulder flanks, running around in a circumferential direction, and formed of a plurality of elevations;
the plurality of elevations have a thickness with respect to a level of the shoulder flanks of 0.5 mm to 2.0 mm; and
the plurality of elevations are dome shaped and have a circular base area, and wherein each of the plurality of elevations of the buffing indicator has the same size and shape; and
wherein the buffing indicator comprises at least three adjacent rows (10b) of elevations running parallel to each other in the circumferential direction, the at least three adjacent rows each having a continuous arrangement of a plurality of elevations, wherein each of the at least three adjacent rows is of a different length ($1b$), wherein the respective lengths ($1b$) of the at least three adjacent rows decrease from row (10b) to row (10b) in the direction of the tread periphery, thereby forming a stepped profile from row to row, wherein the length of each of the at least three adjacent rows is in a range from 20 mm to 200 mm.

2. The tire of claim 1, wherein a diameter of the circular base area is 0.5 mm to 2.0 mm.

3. The tire of claim 1, the elevations (10) border on a side of a reference circle (k1) running around the shoulder flank (8a) that faces the tread periphery, the reference circle (k1) originating from a reference surface (f1) projected onto a respective shoulder flank (8a),
which, when viewed in cross section of the tire, runs parallel to the tread periphery in the region inside the ground contact area and continues to follow its course to the shoulder flanks (8a) in the region axially outside the ground contact area and
which has in the tire equatorial plane (line A-A) a distance (a1), determined in the radial direction, from a radially outermost belt ply (2a) in the direction of the tread periphery of up to 2.0 mm.

4. The tire of claim 3, a distance (a1) between the reference surface (f1) and the radially outermost belt ply (2a) is at least 1.0 mm.

5. The tire of claim 1, a diameter of the circular base areas of the elevations (10) is at least 1.0 mm.

6. The tire of claim 1, a maximum thickness of the elevations (10) is at least 1.0 mm.

7. The tire of claim 1, a magnitude of the maximum thickness of the elevations (10) is at most 50% of the magnitude of the diameter of the circular base area of the elevations (10).

8. The tire of claim 1, a magnitude of the maximum thickness of the elevations (10) is at least 25% of the magnitude of the diameter of the circular base area of the elevations (10).

9. The tire of claim 1, the elevations (10) each have the shape of a hemisphere.

10. The tire of claim 1, elevations (10) which have distances of 0.5 mm to 1.5 mm from one another, determined as minimum distances.

11. The tire of claim 1, elevations (10) which have mutually matching distances, determined as minimum distances, are provided.

12. The tire of claim 1, the buffing indicator (9, 9', 9") is formed on each shoulder flank (8a).

13. A retreadable vehicle tire comprising:
one or more sidewalls;
belt plies;
a tread with one or more shoulder flanks outside a ground contact area and running to the sidewalls;
a buffing indicator to indicate a buffing depth and located on the one or more shoulder flanks, the buffing indicator running around in a circumferential direction, and formed from a plurality of elevations;
the plurality of elevations have a thickness with respect to a level of the shoulder flanks of 0.5 mm to 2.0 mm;
the plurality of elevations are dome shaped and have a circular base area; and
wherein the plurality of elevations of the buffing indicator are arranged to include:
a first set of elevations continuously arranged directly adjacent to each other to form a first circumferential band of elevations, the first circumferential band of elevations having opposite circumferential ends delimited by discontinuity of the first set of elevations in the circumferential direction, wherein a first length of the first circumferential band of elevations is defined by its circumferential extent between its circumferential ends;
a second set of elevations continuously arranged directly adjacent to each other to form a second circumferential band of elevations, the second circumferential band of elevations having opposite circumferential ends delimited by discontinuity of the second set of elevations in the circumferential direction, wherein a second length of the second circumferential band of elevations is defined by its circumferential extent between its circumferential ends, wherein the second band is radially adjacent to and runs parallel to the first band, and wherein the second length of the second circumferential band is less than the first length of the first circumferential band thereby forming a first stepped profile from the first circumferential band to the second circumferential band in the radial direction; and a third set of elevations continuously arranged directly adjacent to each other to form a third circumferential band of elevations, the third circumferential band of elevations having opposite circumferential ends delimited by discontinuity of the third set of elevations in the circumferential direction, wherein a third length of the third circumferential band of elevations is defined by its circumferential extent between its circumferential ends, wherein the third band is radially adjacent to and runs parallel to the second band, and wherein the third length of the third circumferential band is less than the second length of the second circumferential band thereby forming a second stepped profile from the second circumferential band to the third circumferential band in the radial direction.

14. The retreadable vehicle tire according to claim 13,
wherein each of the elevations of the first circumferential band has the same shape and size,
wherein each of the elevations of the second circumferential band has the same shape and size,
wherein each of the elevations of the third circumferential band has the same shape and size,
wherein the first circumferential band of elevations is radially inwardly of the second circumferential band of elevations, and wherein the second circumferential band of elevations is radially inwardly of the third circumferential band of elevations, and
wherein each of the first, second, and third lengths of the first, second, and third circumferential bands of elevations, respectively, is from 20 mm to 200 mm.

15. The retreadable vehicle tire according to claim 14, wherein the first circumferential band of elevations, the second circumferential band of elevations, and the third circumferential band of elevations together constitute a stepped elevation pattern located at a first circumferential position of the buffing indicator,
wherein the stepped elevation pattern is repeated at one or more additional circumferential positions of the buffing indicator, and
wherein circumferential regions of the shoulder flank between stepped elevation patterns is free of elevations.

* * * * *